(12) United States Patent
Jing et al.

(10) Patent No.: US 10,200,615 B2
(45) Date of Patent: Feb. 5, 2019

(54) ELECTRONIC APPARATUS WITH IMAGE CAPTURING THROUGH HOLE FORMED IN DISPLAY REGION

(71) Applicant: BOE Technology Group Co., Ltd., Beijing (CN)

(72) Inventors: Yaoqiu Jing, Beijing (CN); Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/124,399

(22) PCT Filed: May 15, 2015

(86) PCT No.: PCT/CN2015/079063
§ 371 (c)(1),
(2) Date: Sep. 8, 2016

(87) PCT Pub. No.: WO2016/110035
PCT Pub. Date: Jul. 14, 2016

(65) Prior Publication Data
US 2017/0034445 A1   Feb. 2, 2017

(30) Foreign Application Priority Data

Jan. 7, 2015   (CN) .......................... 2015 1 0007210

(51) Int. Cl.
*H04N 5/222* (2006.01)
*H04N 5/232* (2006.01)
(Continued)

(52) U.S. Cl.
CPC ........... *H04N 5/23293* (2013.01); *G02B 6/00* (2013.01); *G02B 6/06* (2013.01); *H04N 5/2252* (2013.01);
(Continued)

(58) Field of Classification Search
CPC .... H04N 5/2252–5/2254; G03B 29/00; G03B 13/00; G03B 13/02; G03B 13/04
(Continued)

(56) References Cited

U.S. PATENT DOCUMENTS 7,034,866 B1 * 4/2006 Colmenarez ........... H04N 7/144
   348/14.07
7,420,608 B2   9/2008 Yamasaki
(Continued)

FOREIGN PATENT DOCUMENTS

CN    1573531 A    2/2005
CN    1627811 A    6/2005
(Continued)

OTHER PUBLICATIONS

International Search Report and Written Opinion, including English translation of Box No. V of the Written Opinion, for International Application No. PCT/CN2015/079063, dated Sep. 11, 2015, 8 pages.
(Continued)

*Primary Examiner* — Kelly L Jerabek
(74) *Attorney, Agent, or Firm* — Westman, Champlin & Koehler, P.A.

(57) ABSTRACT

Embodiments of the present invention disclose an electronic apparatus comprising a display panel having a through hole having a through hole passing therethrough in a thickness direction thereof within a display region, and an image capturing device disposed on a side of the display panel opposite to a light-exiting side and configured to capture an image through the through hole. In the electronic apparatus according to the present invention, eyes of a user can look straight at the camera while viewing the screen when taking a photo of him by himself, thereby obtaining a satisfy or desirable face image.

6 Claims, 5 Drawing Sheets

(51) Int. Cl.
*H04N 13/243* (2018.01)
*H04N 5/225* (2006.01)
*G02B 6/06* (2006.01)
*G02B 6/00* (2006.01)

(52) U.S. Cl.
CPC ......... *H04N 5/2253* (2013.01); *H04N 5/2254* (2013.01); *H04N 13/243* (2018.05); *H04N 2213/001* (2013.01)

(58) Field of Classification Search
USPC .......... 348/333.01, 333.08–333.09, 340, 373
See application file for complete search history.

(56) References Cited

U.S. PATENT DOCUMENTS

| | | | |
|---|---|---|---|
| 7,821,561 B2 | 10/2010 | Tsuboi | |
| 8,965,451 B2 | 2/2015 | Senda | |
| 2004/0189794 A1* | 9/2004 | Rambo | H04N 7/144 348/14.16 |
| 2004/0263670 A1* | 12/2004 | Yamasaki | G06F 3/0412 348/340 |
| 2005/0128332 A1* | 6/2005 | Tsuboi | H04N 5/2253 348/333.12 |
| 2008/0151250 A1 | 6/2008 | Kamijima | |
| 2009/0009628 A1* | 1/2009 | Janicek | H04N 7/144 348/231.99 |
| 2010/0020406 A1* | 1/2010 | Rana | G02B 25/04 359/643 |
| 2011/0285861 A1* | 11/2011 | Maglaque | H04N 7/144 348/207.1 |
| 2012/0133796 A1* | 5/2012 | Wu | G06T 11/00 348/231.99 |
| 2012/0162138 A1* | 6/2012 | Lee | G06F 3/042 345/175 |
| 2013/0210563 A1* | 8/2013 | Hollinger | H04N 5/2252 473/570 |
| 2015/0373303 A1* | 12/2015 | Visosky | G06K 9/00281 348/14.05 |
| 2016/0011633 A1* | 1/2016 | Watanabe | G02F 1/1333 345/184 |

FOREIGN PATENT DOCUMENTS

| | | |
|---|---|---|
| CN | 2713496 Y | 7/2005 |
| CN | 101119435 A | 2/2008 |
| CN | 102348091 A | 2/2012 |
| CN | 103115846 A | 5/2013 |
| CN | 103327167 A | 9/2013 |
| CN | 203350587 U | 12/2013 |
| CN | 103780812 A | 5/2014 |
| CN | 104539833 A | 4/2015 |
| CN | 204305180 U | 4/2015 |
| JP | 2005-130001 A | 5/2005 |
| JP | 2007-272523 A | 10/2007 |
| JP | 2011-259089 A | 12/2011 |

OTHER PUBLICATIONS

First Office Action, including Search Report, for Chinese Patent Application No. 201510007210.8, dated Mar. 30, 2017, 12 pages.
Rejection Decision for Chinese Patent Application No. 201510007210.8, dated Aug. 18, 2017, 15 pages.
Second Office Action for Chinese Patent Application No. 201510007210.8, dated Jun. 9, 2017, 14 pages.

* cited by examiner

ELECTRONIC APPARATUS WITH IMAGE CAPTURING THROUGH HOLE FORMED IN DISPLAY REGION

CROSS-REFERENCE TO RELATED APPLICATION

This Application is a Section 371 National Stage Application of International Application No. PCT/CN2015/079063, filed 15 May 2015 and published as WO 2016/110035 A1 on 14 Jul. 2016, in Chinese, the contents of which are hereby incorporated by reference in their entirety.

BACKGROUND OF THE INVENTION

Field of the Invention

Embodiments of the present invention relate to an electronic apparatus.

Description of the Related Art

In a conventional electronic apparatus, a camera for capturing images is provided separately with a screen for displaying images. When taking a photo of oneself, a user must keep his eyes looking straight at the camera to obtain an orthographic image. However, when looking straight at the camera, the user can not watch the image of himself displayed on the screen. As a result, it is difficult for the user to obtain a satisfied or ideal photo image.

SUMMARY OF THE INVENTION

Embodiments of the present invention provide an electronic apparatus by which a user can look straight at a camera while watching an image of himself or herself on the screen when taking a photo of himself or herself.

According to an exemplary embodiment of the present invention, there is provided an electronic apparatus comprising a display panel having a through hole passing therethrough in a thickness direction thereof within a display region, and an image capturing device disposed on a side of the display panel opposite to a light-exiting side of the display panel and configured to capture an image through the through hole.

According to an exemplary embodiment of the present invention, the thorough hole is located at a center of the display region.

According to an exemplary embodiment of the present invention, the display region comprises a pixel region, and the through hole is located in the pixel region.

According to an exemplary embodiment of the present invention, the pixel region has pixels therein, and the through hole is located at a position corresponding a pixel.

According to an exemplary embodiment of the present invention, the pixel region has sub-pixels therein, and the through hole is located at a position corresponding to a sub-pixel.

According to an exemplary embodiment of the present invention, the through hole comprises one through hole located in a region corresponding to one of the sub-pixels; or the through hole comprises a plurality of through holes, each of which is located in a region corresponding to one of the sub-pixels.

According to an exemplary embodiment of the present invention, the display region comprises a black matrix region, and the through hole is located in the black matrix region.

According to an exemplary embodiment of the present invention, the display panel is a self-luminous type display panel.

According to an exemplary embodiment of the present invention, the image capturing device comprises a lens group disposed to face toward the through hole to capture an image through the through hole by using a pinhole imaging principle.

According to an exemplary embodiment of the present invention, the image capturing device comprises a fiber camera, at least a part of which is disposed in the through hole.

With the electronic apparatus according to the embodiments of the present invention, the user can look straight at the camera with his or her eyes while watching the screen when taking a photo of himself, thereby obtaining a satisfying or desirable orthographic image.

BRIEF DESCRIPTION OF THE DRAWINGS

The accompanying drawings herein can provide further understanding to embodiments of the present invention and form a part of the embodiments of the present invention. Illustrative embodiments of the present embodiments and their description are intended to explain the present embodiments, rather than being construed as being limited thereto, in which.

DETAILED DESCRIPTION OF PREFERRED EMBODIMENTS OF THE INVENTION

Embodiments of the present invention will be described hereinafter in detail with reference the accompanying drawings. It should be noted that the embodiments described herein are intended to only explain and illustrate the present embodiments, rather than being construed as being limited thereto.

Figure 1:
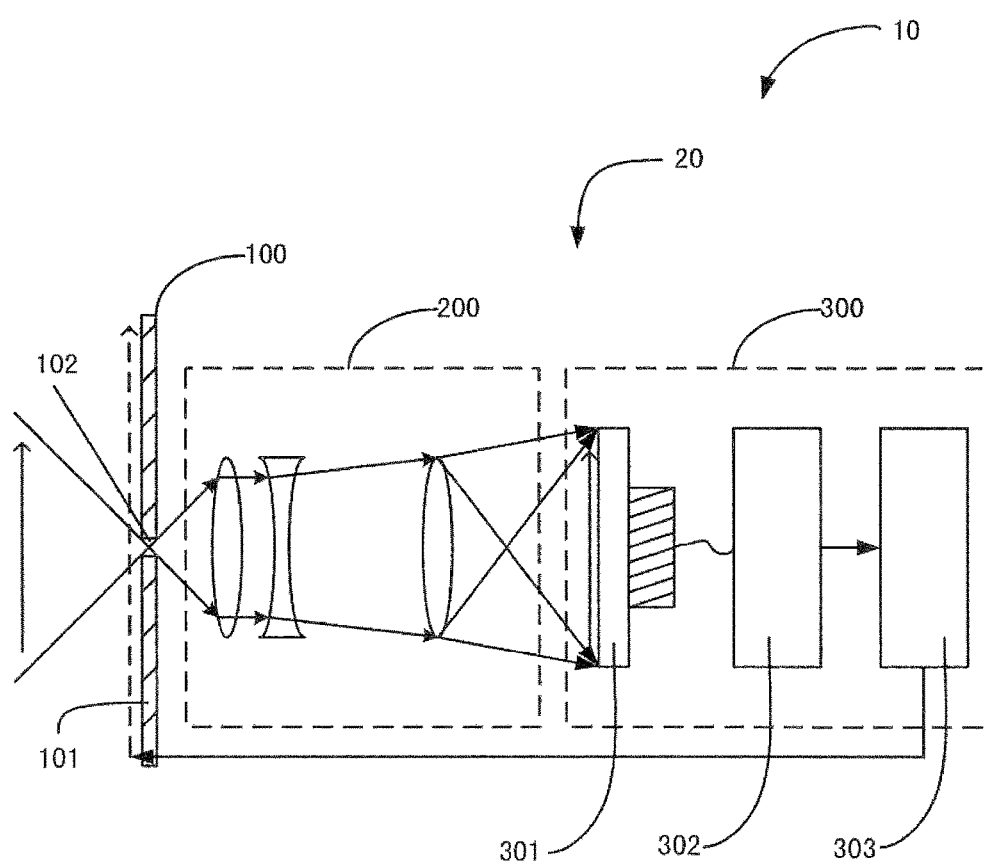
FIG. 1 is a schematic view of an electronic apparatus according to a first exemplary embodiment of the present invention.
Figure 2:
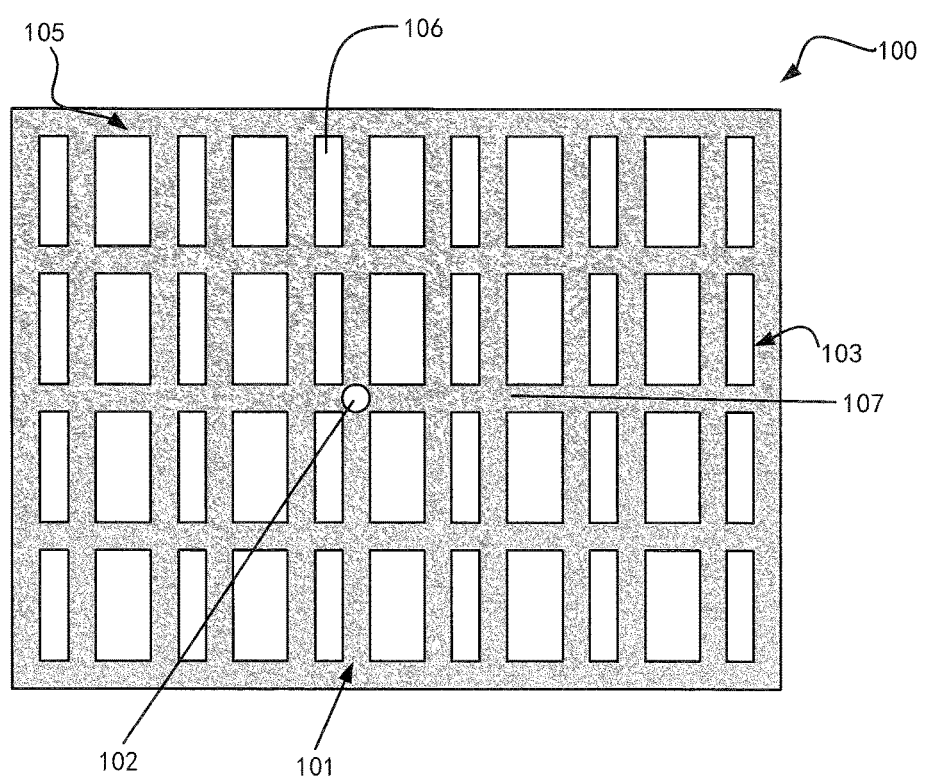
FIG. 2 is a schematic view showing a position of a through hole of the electronic apparatus according to the first embodiment of the present invention.
Figure 3:
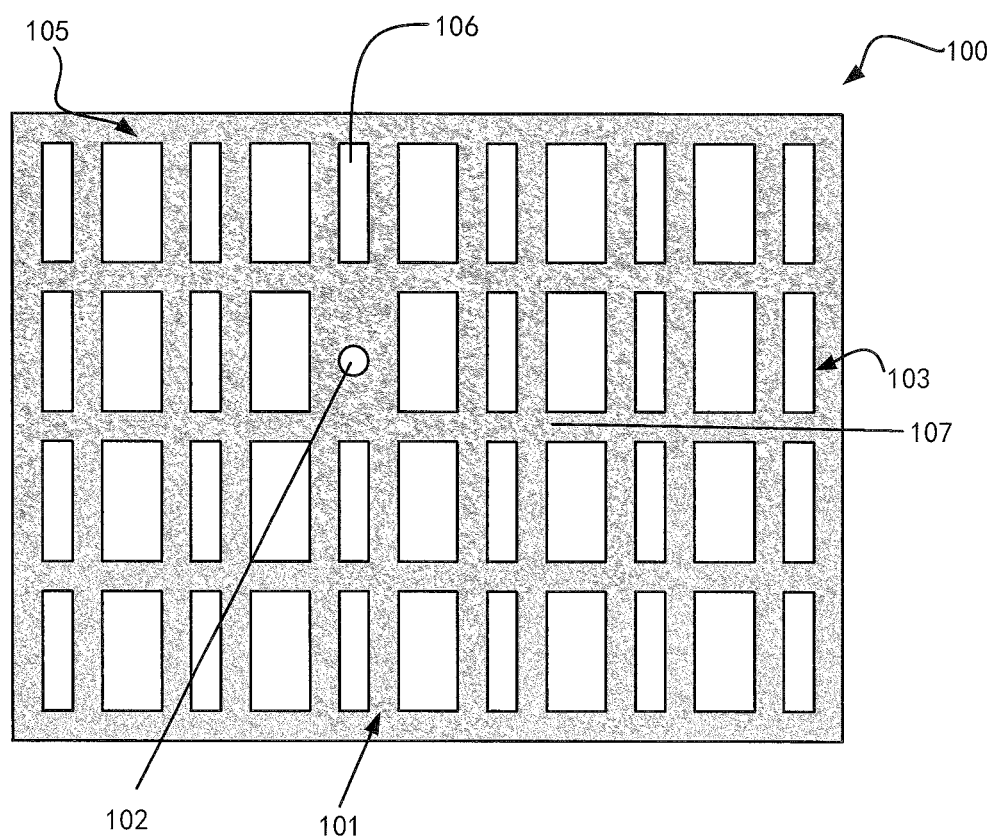
FIG. 3 is a schematic view showing another position of the through hole of the electronic apparatus according to the first embodiment of the present invention.

FIG. 1 shows an electronic apparatus according to a first embodiment of the present invention, and FIGS. 2 and 3 show a position of a through hole of the electronic apparatus according to the first embodiment of the present invention.

As shown in FIGS. 1 to 3, the electronic apparatus 10 according to the first embodiment of the present invention comprises a display panel 100 having a through hole 102 passing therethrough in a thickness direction thereof within a display region 101. The electronic apparatus 10 further comprises an image capturing device 20 disposed on a side of the display panel 100 opposite to a light-exiting side. The image capturing device 20 is configured to capture an image through the through hole 102. The display panel 100 may be a self-luminous type display panel such as an organic light-emitting diode display panel, a plasma display panel, a quantum dot display panel and the like. The through hole 102 may be a circular hole or a hole of other suitable shape.

The electronic apparatus may be a display, a TV set, a mobile phone, a tablet or the like.

As illustrated in FIGS. 1 to 3, as an example of the first embodiment of the present invention, the through hole 102 is located substantially at a center of the display region 101. According to another example, the display region 101 includes a pixel region 103, and the through hole 120 is located in the pixel region 103. According to an exemplary embodiment of the present invention, as shown in FIG. 3, the pixel region 103 has pixels 105 therein. The through hole 120 may be located at a position corresponding to a pixel 105. According to an exemplary embodiment of the present invention, as depicted in FIG. 3, the display region 103 has sub-pixels 106 therein, and the through hole 102 may be located at a position corresponding to a sub-pixel 106.

According to other embodiments of the present invention, as shown in FIG. 2, the display region 101 may comprise a black matrix region 107, and the through hole 102 is located in the black matrix region 107. The through hole 102 may include one or more through holes 102.

According to other embodiments of the present invention, as shown in FIG. 3, the through hole 102 may include one through hole 102 located at a position corresponding to one of the sub-pixels 106. Alternatively, the through hole 102 may include a plurality of through holes 102, each of which is located at a position corresponding to one of the sub-pixels 106.

The through holes 102 may be located both at positions corresponding to the black matrix 107 and the sub-pixels 106.

According to other embodiments of the present invention, the display region may include a pixel region and a black matrix region. The through hole may include a plurality of through holes, and the plurality of through holes may be located in the pixel region and the black matrix region, respectively. Particularly, in the pixel region, the through hole may be located in a sub-pixel region. According to an exemplary embodiment of the present invention, as illustrated in FIG. 1, the image capturing device 20 comprises a lens group 200 disposed to face toward the through hole 102 to capture an image through the through hole 102 by using a pinhole imaging principle. The image capturing device 20 further comprises an image acquisition and storage section 300 which for example includes an image sensor 301 such as a CCD or COMS, a signal processor 302 and a storage 303. The image sensor 301 is used to acquire an external image to generate image data. The signal processor 302 is used to process the image data for convenience of storage. The storage 303 is used to storage the processed image data in a format of a picture or a video.

According to the above embodiments, by using the pinhole imaging principle, a portrait in front of the display panel will be imaged on a back side of the display panel through the through hole. The portrait will be imaged onto the image sensor 301 through the lens group 200 at a position on the back side of the display panel directly facing the through hole. Thereafter, the imaged portrait will be acquired and processed by the signal processor 302 to be displayed on the display panel so as to achieve photographing, videoing or the like. In this way, a user can look straight at a camera with his or her eyes and at the same time the user can watch a screen, thereby achieving a satisfying or desirable orthographic image.

Figure 4:
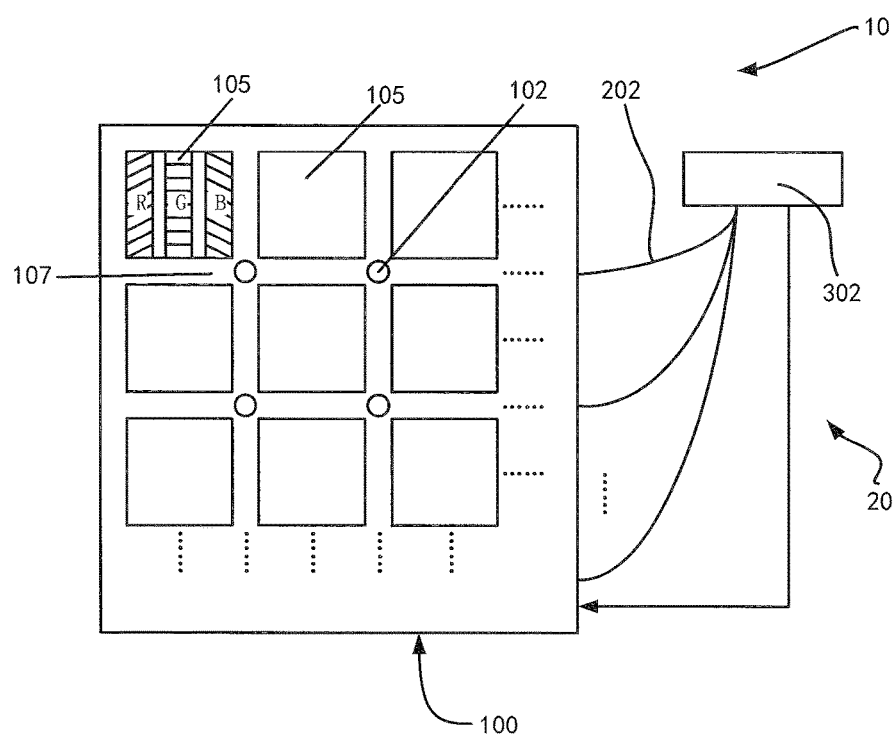
FIGS. 4 and 5 are schematic views of an electronic apparatus according to a second exemplary embodiment of the present invention.
Figure 5:
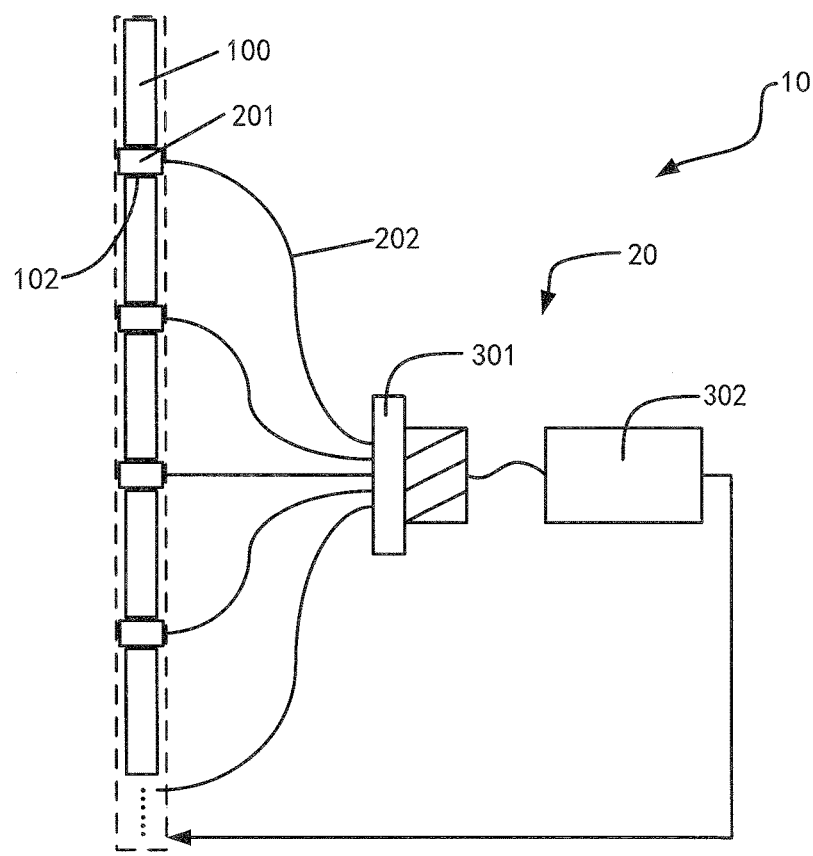

FIGS. 4 and 5 show schematic views of an electronic apparatus according to a second embodiment of the present invention. The electronic apparatus of this embodiment is different from that of the first embodiment in an image capturing device 20 different from that in the first embodiment. Other features of the second embodiment are same as those of the first embodiment. Therefore, the different parts of the second embodiment from the first embodiment are merely described below.

As illustrated in FIGS. 4 and 5, the image capturing device 20 comprises a fiber camera 201, at least a part of which is disposed in the through hole 102. In the embodiment illustrated in FIGS. 4 and 5, the through hole 102 includes a plurality of through holes 102 located in the black matrix region 107. A plurality of fiber cameras 201 are arranged as a fiber camera array. Images acquired by the fiber camera array are transmitted to an image sensor 301 through fibers 202. Each of the fiber cameras 201 corresponds to one of detecting units of the image sensor 301 to obtain corresponding image data. The image data are processed in a signal processor 302 and then transmitted to the display panel 100 to be displayed.

According to embodiments of the present invention, a user can look straight at a camera with his or her eyes while watching a screen when taking a photo of himself, thereby obtaining a satisfying or desirable orthographic image.

In the above-described embodiments, two kinds of image capturing devices 20 are described. However, the image capturing device 20, may be any suitable image capturing device.

It should be understood that the above embodiments are merely exemplary embodiments for illustrating the present invention, and the present invention is not limited thereto. It would be appreciated by those skilled in the art that various changes or modifications may be made to the embodiments of the present invention without departing from the principle and spirit thereof. Therefore, all equivalents also fall within the scope of the present invention. The scope of the present invention is merely defined by the appended claims.

What is claimed is:

1. An electronic apparatus, comprising:
a display panel having:
a display region; and
a single through hole passing through the display panel in a thickness direction of the display panel, located in the display region, and having an internal wall defining an internal space; and
an image capturing device disposed on a side of the display panel opposite to a light-exiting side of the display panel and configured to capture an image through the through hole,
wherein the image capturing device comprises a lens group disposed to face toward the through hole to capture an image through the through hole by using a pinhole imaging principle, and the lens group comprises two convex lenses and one concave lens located between the two convex lenses, and
wherein the display region comprises a pixel region in which pixels are disposed, each of the pixels has sub-pixels and a black matrix region between adjacent ones of the sub-pixels, and the single through hole is located at a position corresponding to one of the sub-pixels or the single through hole is located in the black matrix region between adjacent ones of the sub-pixels in one of the pixels.

2. The electronic apparatus according to claim 1, wherein the thorough hole is located at a center of the display region.

3. The electronic apparatus according to claim 1, wherein the display panel is a self-luminous type display panel.

4. The electronic apparatus according to claim 1, wherein the image capturing device further comprises an image acquisition and storage section for acquiring and processing the image obtained through the lens group so as to display the image on the display panel.

5. The electronic apparatus according to claim 4, wherein the image acquisition and storage section comprises an image sensor, a signal processor and a storage.

6. The electronic apparatus according to claim 5, wherein the image sensor, the lens group, a substrate, and the pixels on the substrate are arranged in this order in a light-exiting direction of the electronic apparatus.

* * * * *